United States Patent Office 3,055,952
Patented Sept. 25, 1962

3,055,952
HYDROXYL-TERMINATED POLYMERS
Earl J. Goldberg, Wilmington, Del., assignor to E. I. du Pont de Nemours and Company, Wilmington, Del., a corporation of Delaware
No Drawing. Filed Oct. 9, 1957, Ser. No. 689,033
3 Claims. (Cl. 260—635)

This invention is directed to novel hydroxyl-terminated polymeric hydrocarbons of molecular weight 650–9900. These polymeric diols are useful for the preparation of sulfur-curable polyurethane elastomers possessing improved hydrolytic stability and better freeze resistance.

It has long been known that organic diisocyanates can react with glycols of low molecular weight to form high molecular weight products. Such products, however, are not rubber like. It has been observed that a more useful approach is to react organic diisocyanates with hydroxyl-terminated polyesters of molecular weight above about 750. The isocyanate-modified polyesters can be chain-extended with compounds containing active hydrogen atoms and subsequently converted to valuable elastomers by cross-linking with additional diisocyanate. A number of these elastomers, however, are susceptible to slow deterioration when they are exposed to water vapor.

More specifically, the present invention relates to novel hydroxyl-terminated polymeric hydrocarbons having a molecular weight ranging from about 650 to 9900 of the structure $HO-CH_2-CH_2-M-CH_2-CH_2-OH$ where M is a bivalent hydrocarbon radical selected from the group consisting of (1)

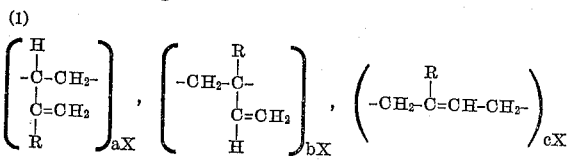

(2)

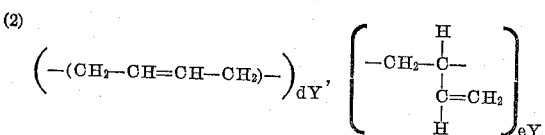

(3) mixtures of (1) and (2), and, (4) copolymers of (1) and (2) together and individually with up to 40% styrene by weight of M where R is $C_1-C_8$ alkyl; X and Y are integers which indicate the weight of (1) and (2), respectively, present in M; the value of $a$ ranges from about 0.60 to 0.80, $b$ from about 0.20 to 0.40, $c$ from about 0 to 0.10, $d$ from about 0.2 to 0.4, and $e$ from about 0.6 to 0.8, with the proviso that $a+b+c=1$ and $d+e=1$.

The hydroxyl-terminated polymeric hydrocarbons of the present case are, in general, prepared from hydrocarbon monomers such as butadiene, isoprene, and 2-ethyl butadiene which possess conjugated unsaturation. Hydrocarbon monomers which have unconjugated ethylenic unsaturation such as isobutylene, propylene, butene, and cyclohexene are generally not useful because they are not anionically polymerizable. Styrene, which has an unusually active vinyl group, is an exception and may be copolymerized with the conjugated dienes. Monomers such as acrylonitrile, ethylacrylate, and methyl methacrylate are unsuitable because the cyano and ester groups are reactive with the organic metallic end groups present. Thus the bivalent radical M is made up of units of a single anionically polymerizable conjugated diene (such as isoprene) or units of several anionically polymerizable conjugated dienes (randomly distributed or in blocks).

It is an object of the present invention to produce novel hydroxyl-terminated polymeric hydrocarbons. It is a further object to produce novel hydrocarbons for the preparation of valuable elastomers and vulcanized elastomers. These and other objects will be apparent in the specification and claims.

The homogeneous anionic polymerization is carried out in tetrahydrofuran. Initially lithium naphthalene or lithium metal (in the form of a wire, ribbon or dispersion) is present in the tetrahydrofuran. Monomer is introduced into the tetrahydrofuran and polymerized to give a lithium-terminated polyaliphatic hydrocarbon. The monomer appears to polymerize in an equivalent fashion whether lithium naphthalene or lithium metal is present initially. The molecular weight attained by the polymer is governed solely by the molar ratio of the catalyst to monomer.

It is to be understood that the propagation of the polymerization occurs in homogeneous solution, i.e., that the surface of the lithium naphthalene (or the lithium metal) does not participate in the propagation process. When lithium metal is used the rate of propagation at the reaction temperature employed is slow enough relative to the rate of initiation so that substantially all the lithium metal is consumed before much of the monomer has been polymerized.

Sodium naphthalene or sodium metal may be employed in place of the corresponding lithium compounds. The rate of propagation relative to initiation is faster when sodium is used, however. Unless the process with sodium metal is conducted at a very low temperature, (e.g., $-60°$ C.) it is difficult to get all the metal reacted before the propagation reaction has consumed all the monomer. Furthermore, the sodium-terminated polyhydrocarbon products are less stable than their lithium-terminated analogues and will attack the tetrahydrofuran solvent if allowed to stand overnight—even at room temperature. Thus, lithium is preferred.

The anionic nature of the polymerization has a profound influence on the distribution of the possible structural units in the polymer when a conjugated diene monomer is employed. Thus, anionically polymerized polybutadiene contains about 60–80% (1,2) C=C units and 20–40% (1,4) C=C units. Conventional free radical polymerized polybutadiene contains about 20% (1,2) C=C units and 80% (1,4) units. Anionically polymerized polyisoprene has about 25% (1,2) C=C units and 75% (3,4) units whereas radical polymerized polyisoprene contains about 5–6% (1,2) units, 5–6% (3,4) units and the balance 1,4 units.

The compounds of the present invention are made by reacting the alkali metal-terminated polymer with ethylene oxide and subsequently hydrolyzing the alkoxide obtained according to the following representative equation:

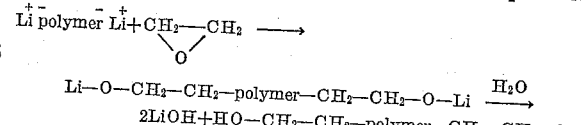

In Example 1 is described the precautions that must be observed to carry out the preparation of the lithium-terminated polymeric hydrocarbon; they are: (1) an inert atmosphere must be provided to exclude water vapor and oxygen, (2) the reaction vessels must be carefully dried before use, (3) the monomers and solvent must be dried and freed from contaminants which can react with the lithium naphthalene catalyst or the alkali metal-terminated end groups of the polymers subsequently prepared. It is preferable to distill the monomers into the reaction vessel directly from the flask in which they have been finally purified. Similar precautions apply when a sodium-terminated polymeric hydrocarbon is made.

The lithium naphthalene catalyst is prepared by agitating equimolar amounts of lithium and naphthalene in purified tetrahydrofuran solvent under an inert atmosphere. When the last fragments of lithium have disappeared, the agitation is continued for about 2-3 hours longer. The catalyst solution has a characteristic green color. A similar procedure may be used to prepare sodium naphthalene catalyst.

The polymerization is then carried out by introducing the hydrocarbon monomer into the catalyst solution. The monomer may be distilled into the vessel containing the catalyst solution. The temperature at which the polymerization is carried out may range from about −80° C. to about −20° C. It is preferable not to exceed the boiling point of the monomer at atmospheric pressure. However, it is possible to work at temperatures above the boiling point of the monomer if the monomer is sufficiently soluble in the solvent used. In general, a temperature of about −30° C. is suitable. The color of the catalyst solution changes from green to deep red soon after the monomer addition has begun. The reaction time employed is not critical; satisfactory results are obtained if the monomer addition is carried out over a 1-2 hour period. If lithium metal is employed in place of lithium naphthalene, the procedure is simplified. The metal is introduced into the tetrahydrofuran as a ribbon or wire or dispersion. The tetrahydrofuran is subsequently cooled to about −30° C. Then the monomer is introduced over a 2 to 3 hour period. Example 7 illustrates this procedure.

When all the monomer has been introduced and reacted, the ethylene oxide is added to the solution. Vigorous agitation should be provided for this step. The preferred procedure is to add the ethylene oxide as rapidly as possible as a liquid to the solution of the lithium-terminated (or sodium-terminated) polymeric hydrocarbon at a temperature in the neighborhood of −50° C. It is desirable to use ethylene oxide in excess of the stoichiometric requirements. There is a tendency for the solution to become quite thick and viscous when the ethylene oxide has reacted with the lithium-terminated (or sodium-terminated) polymer. If only two molar equivalents of ethylene oxide is used for each mole of polymer and if, moreover, its addition is carried out slowly, the solution may become inconveniently viscous before all the ethylene oxide has been introduced and dispersed unless the polymer solution is very dilute (about 1-2% by weight). When excess ethylene oxide is used and the addition is carried out as rapidly as possible, polymer concentrations at least as high as 7% by weight may be treated without thickening occurring. The excess ethylene oxide in some way prevents gelation. When a solution containing 20% by weight of polymer is treated by the ethylene oxide, thickening occurs about 10-60 seconds after the addition is complete. The delay is sufficient to allow proper dispersion; the reaction continues to completion in the thick mass within a few hours.

When all the dilithium (or disodium) polymeric hydrocarbon has reacted with the ethylene oxide, the dark red color of the reaction mixture disappears and the mass becomes colorless. The intermediate obtained may be converted to the desired hydroxyl-terminated polymeric hydrocarbon by the introduction of water. Any thick material present readily disperses. The polymer solution is diluted with water to precipitate the polymer which is then purified by repeated extractions with hot water. It is finally dried under high vacuum. Naphthalene derived from the lithium (or sodium) naphthalene catalyst is sublimed out at this time. The hydroxyl-terminated polymeric hydrocarbon product is obtained as a viscous oil.

The compounds of the present invention may be used to prepare elastomers by the reaction between approximately molar equivalents of a polyhydrocarbon diol and an organic diisocyanate. In place of some of the polyhydrocarbon diol there may also be employed, as chain extending agents, such compounds as water, glycols, diamines and the like, each of which contains two active hydrogen atoms capable of reaction with an isocyanate group. A second method is to convert the long-chain diols to the corresponding bis(chloroformates) by reacting the diols with phosgene in an inert solvent (such as toluene) and to react the bis(chloroformates) obtained with a primary diamine (corresponding to the diisocyanate which would be used in the first method) in water solution in the presence of an acid acceptor and, optionally, more phosgene.

Example 2 of the present application illustrates the preparation of a polyurethane by the reaction in tetrahydrofuran solvent of hydroxyl-terminated polybutadiene with a substantially molar equivalent amount of toluene-2,4-diisocyanate. Iron acetylacetone and triethylamine are present as catalysts. After the mixture has been agitated at room temperature for about a day, the intrinsic viscosity of the polymer isolated is about 0.7-0.9 (measured at 30° C. in a mixture 85 parts by weight tetrahydrofuran and 15 parts by weight dimethylformamide). Chain extension may be carried out by a second procedure in which the reactants are agitated for a day at room temperature, treated with water, and subsequently agitated an extra day at room temperature prior to the isolation of the polymer product. The intrinsic viscosity of the polymer obtained this way is 0.7-1.15.

Any of a wide variety of organic diisocyanates, including aromatic, aliphatic, and cycloaliphatic diisocyanates and combinations of these types may be reacted with the long-chain diols of the present invention to make elastomers Arylene diisocyanates, that is, those in which each of the two isocyanate groups is attached directly to an aromatic ring, are preferred. Compounds such as toluene-2,4-diisocyanate in which the two isocyanate groups differ in reactivity are especially desirable.

The substantially linear polymer obtained at this stage is a somewhat elastic homogeneous solid capable of being cured to form a vulcanized elastomer. If nearly all the isocyanate groups have been used up by reaction with the long-chain glycol, the polymer will be stable and will not cure until additional di- or triisocyanate curing agent is added or unless a vulcanization with sulfur is carried out.

When the substantially linear uncured reaction product is cured it is believed that cross-linking of the polymer chains occurs. The cured or vulcanized elastomer is no longer workable on a rubber mill to form a continuous band. Cross-linking ordinarily takes place (when sulfur vulcanization is not used) by the reaction of a compound containing a plurality of isocyanate groups with active hydrogen atoms present in different polymer chains, e.g., the hydrogen atoms of urea groups.

The curing of the elastomers prepared from the hydroxyl-terminated polymeric hydrocarbons of the present invention may be carried out by the addition of from 1 to 20% of a diisocyanate, based on the weight of the uncured reaction product, to effect the curing of stabilized products. The diisocyanate may conveniently be mixed with the uncured product on a rubber mill and the mixture may then be cured by placing it in a mold and heating under pressure. Only enough pressure is required to force the elastomer to assume the shape of the mold. The temperatures and pressures used in ordinary rubber processing are satisfactory for use in curing the elastomers. Pressures of 50 to 1000 pounds per square inch or higher and temperatures of from 80 to 175° C. are ordinarily satisfactory. Usually 30 minutes at 130-135° C. is sufficient. When vulcanization is accomplished by means of sulfur, the techniques used in vulcanizing rubber are applicable, including the use of accelerators.

Representative examples illustrating the present invention follow.

EXAMPLE 1

A. *Experimental Techniques and Purification of Materials*

A glass reaction vessel is used which is equipped with a gas inlet tube, a glass paddle agitator, a thermometer, and a gas exit line. All the equipment is flamed prior to assembly and flamed again while swept with argon after assembly. During the preparation of the lithium naphthalene catalyst and during the polymerization process which follows a slight positive pressure of an inert gas is maintained. Cylinder argon and nitrogen contain sufficient impurities to slowly decolorize dilute solutions of lithium naphthalene. These impurities are readily removed by scrubbing the gas in a bubbler containing lithium naphthalene solution.

The tetrahydrofuran used as a solvent is purified by distillation away from sodium naphthalene. It was determined that the tetrahydrofuran so purified did not react with trace quantities of lithium naphthalene as evidenced by the persistence of the characteristic green color.

Lithium ribbon is scraped and pounded out under mineral oil to prepare a shiny shurface. It is washed rapidly with dry tetrahydrofuran prior to use.

Butadiene (Instrument Grade commercially available from the Mathieson Chemical Co.) is refluxed overnight over lithium aluminum hydride and distilled into the reaction mixture as needed. Butadiene of satisfactory purity can be obtained by passing it through a silica gel column. All but $1.5 \times 0^{-6}$ mole percent active impurity can be removed as indicated by titration with a standard lithium-naphthalene solution. A pure butadiene can be obtained by titrating the butadiene with a lithium-naphthalene solution to the point where anion color persists and then rapidly distilling into the reaction mixture.

B. *Preparation of the Lithium-Naphthalene Catalyst*

2.78 parts (0.4 mole) of lithium, 56.4 parts (0.44 mole) of naphthalene, and 1775 parts of purified tetrahydrofuran are charged into a glass reaction vessel which has just been flamed while swept with argon. A slight positive pressure of purified argon is maintained at all times thereafter. The catalyst formation is marked by heat evolution which is moderated by application of external cooling. The reactants are agitated for about 3 hours; no lithium metal is visible after about the first hour. The catalyst solution has a characteristic green color.

C. *Preparation of the Lithium-Terminated Polybutadiene*

The catalyst solution prepared above in (B) is cooled to about −30° C. Purified butadiene is metered in through a rotameter at the rate of about 3.08 parts/minute. The color of the medium changes from green to orange soon after some of the butadiene has been added. The temperature is maintained at about −32° C. during the addition of the butadiene. The viscosity of the medium increases during this period. A total of about 324 parts (6.0 mole), of butadiene is introduced.

D. *Preparation of Hydroxyl-Terminated Polybutadiene*

The solution of lithium-terminated polybutadiene obtained in (C) above is chilled to about −55° C. as soon as the butadiene addition is complete. 66.5 parts (1.51 moles of ethylene oxide, which has just been distilled through a soda lime column and collected as a liquid, is added to the rapidly agitated polymer solution in about 10 seconds. The medium becomes very thick. Over a period of several hours 22.2 parts (0.505 mole) of additional ethylene oxide is distilled into the reaction flask. The color of the polymer solution fades from red-black to medium red soon after the rapid addition of the ethylene oxide. After the mixture has stood overnight, it is colorless.

The thick mass is treated with 25 parts of water to hydrolyze the lithium salt and obtain the free hydroxyl-terminated polybutadiene. Within one hour the polymer solution is quite fluid. 0.3 part of 2,6-di-tert-butyl-p-cresol is added as an anti-oxidant. Then 2000 parts of water is introduced. The polymer separates along with a small amount of tetrahydrofuran. The polymer phase is treated with three 3000-part portions of water at 50° C. It is then boiled with two successive 3000-part portions of water for 1 hour each. The polymer is then dried under high vacuum with steam heat. The hydroxyl-terminated polybutadiene is obtained as a pale yellow oil of low viscosity; the isomer ratio is shown, by infrared analysis, to be 29% 1,4 cis, 3% 1,4 trans and 67% 1,2.

End hydroxyl group indicates an equivalent weight of 1130 (theoretical—855 if 6 moles of butadiene were delivered).

EXAMPLE 2

A. *Preparation of the Hydroxyl-Terminated Polybutadiene*

The lithium naphthalene catalyst is prepared from 2.08 parts (0.30 mole) of lithium and 42.2 parts (0.33 mole) of naphthalene in 1330 parts of purified tetrahydrofuran under a purified argon atmosphere by the procedure given above in 1A and 1B. 324 parts (6.0 moles) of purified butadiene is polymerized with this catalyst by the procedure given above in 1C. The lithium-terminated polybutadiene is treated by the addition of about 17.6–19.8 parts (0.4–0.45 mole) of ethylene oxide in about 30 seconds. The very thick mass is allowed to warm up to room temperature over a period of 3–4 hours and additional ethylene oxide is distilled into the reaction vessel in the same period to make a total of 39.6 parts (0.9 mole). The deep red color of the reaction mass disappears after the mass has been allowed to stand at room temperature overnight. The lithium salt is decomposed with water and the polymer is purified and isolated by the procedure described above in (D). End hydroxyl group analysis indicates that the viscous product has an equivalent weight of 1677 (the theoretical value is 1125–1303). The intrinsic viscosity in a tetrahydrofuran/dimethyl formamide mixture at 30° C. is 0.10. The isomer ratio is shown, by infrared analysis, to be 29% 1,4 cis, 2% 1,4 trans and 68% 1,2.

B. *Chain Extension With Toluene-2,4-Diisocyanate*

(1) To a solution of 33.5 parts (0.01 mole) of the hydroxyl-terminated polybutadiene in 31 parts of anhydrous tetrahydrofuran is added 1.63 parts (90% theory of 0.0104 mole) of toluene-2,4-diisocyanate, 0.006 part iron acetylacetone (10% solution in acetone), and 0.013 part of triethylamine. The mixture obtained is agitated for 26 hours at 25–27° C. The viscosity increases for about 16–18 hours and then appears to remain unchanged. Half the mixture obtained is poured into methanol. The polymer, which precipitates, is dried to constant weight under vacuum. It has an intrinsic viscosity of 0.42. The remaining half of the mixture is treated by the addition of 1 part of water in 9 parts of tetrahydrofuran and subsequent agitation at room temperature for 46 hours. The intrinsic viscosity of the polymer isolated is 0.70.

(2) 33.5 parts (0.01 mole) of the hydroxyl-terminated polybutadiene is chain-extended with the theoretical amount—1.81 parts (0.0104 mole) of toluene-2,4-diisocyanate by both procedures described in B(1) above. The intrinsic viscosities obtained are 0.32 and 1.03, respectively.

(3) 33.5 parts (0.01 mole) of the hydroxyl-terminated polybutadiene is chain-extended with 1.98 parts (0.0112 mole, 107.5% of theory) of toluene-2,4-diisocyanate by both procedures described in B(1) above.

The intrinsic viscosities obtained are 0.30 and 0.89, respectively.

EXAMPLE 3

*Preparation of Hydroxyl-Terminated Polybutadiene*

The lithium naphthalene catalyst is prepared from 0.69 part (0.10 mole) of lithium and 19.3 parts (0.15 mole) of naphthalene in 1640 parts of purified tetrahydrofuran under a purified argon atmosphere by the procedure given in 1A and 1B. The catalyst solution obtained is chilled to −30° C. and treated by addition of 108 parts (2.0 moles) of liquid butadiene over a one-minute period. The temperature rises to 25° C. in about 5 minutes. The mixture is stirred at 25° C. for one-half hour and chilled to −50° C. Then 13.2 parts (0.3 mole) of ethylene oxide (distilled through soda lime) is quickly introduced with vigorous stirring. No gel is formed. The red color of the polymer solution pales at once and completely disappears after the solution has been allowed to warm up to about 10° C. over a 40-minute period. The mixture is allowed to stand overnight and is then treated by the procedure of Example 1D to yield the colorless, transparent, viscous liquid hydroxyl-terminated polybutadiene. End hydroxyl group analysis indicates an equivalent weight of 2191. The intrinsic viscosity of the polymer is 0.13. The isomer ratio is shown, by infrared analysis, to be 31% 1,4 cis, 2% 1,4 trans and 66% 1,2.

EXAMPLE 4

A. *Preparation of Hydroxyl-Terminated Polyisoprene*

Lithium naphthalene is prepared from 2.1 parts (0.303 mole) of lithium and 50 parts (0.391 mole) of naphthalene in 890 parts of tetrahydrofuran by the procedure given in Example 1A, B. Isoprene (commercially available as Phillips Pure Grade from the Phillips Petroleum Company) is purified by a 16-hour reflux over lithium aluminum hydride; it is distilled into the reaction mixture as needed. A purer isoprene is obtained by titrating the isoprene with a lithium naphthalene solution to the point where anion color persists and then rapidly distilling into the reaction mixture.

The solution of lithium naphthalene in tetrahydrofuran is cooled to −70° C. Then 150 parts (2.21 moles) of isoprene are distilled in. The reaction mixture turns a reddish-brown hue. When all the isoprene has been added, the temperature of the mixture is slowly raised to room temperature. Agitation is continued for 1 hour.

A 200-cc. portion is pumped out into wet tetrahydrofuran. The color of the solution disappears instantly. A trace of 2,6-di-tert-butyl-p-cresol is added and the polymer is treated by steam distillation to remove naphthalene. The polyisoprene is subsequently dried under vacuum at 100° C. It is an oil with an intrinsic viscosity of 0.02 and an ebulloscopic molecular weight of 1065 (theory 1000).

The balance of the solution of the lithium-terminated polyisoprene is cooled to −80° C. and 22 parts (0.5 mole) of ethylene oxide is distilled in. After about half of the ethylene oxide has been added, the mixture sets up to a stiff gel. The gel is warmed to room temperature and is allowed to stand overnight. About 15 parts of water is added. The lithium salt is precipitated by strong external cooling. The sollution is filtered and the filtrate obtained is concentrated. The polymer is treated with steam to remove naphthalene. The hydroxyl-terminated polyisoprene obtained has an intrinsic viscosity of 0.04. End hydroxyl-group analysis indicates an equivalent weight of 935. The isomer ratio is shown, by infrared analysis, to be 75% 3,4 and 25% 1,2.

B. *Chain Extension of the Polyisoprene Glycol*

18.7 parts of the polyisoprene glycol and 3.48 parts of toluene-2,4-diisocyanate are heated with stirring at 80–90° C. for 2.75 hours. 200 parts of dry tetrahydrofuran is added to dissolve the polymer. The solution obtained is treated with 0.72 part of water and subsequently agitated for 2 hours. It is allowed to stand for 2 days. The polymer obtained after vacuum drying has an intrinsic viscosity of 0.27.

EXAMPLE 5

*Preparation of Hydroxy-terminated Poly(2-Ethyl)Butadiene*

The lithium naphthalene catalyst is prepared from 2.78 parts (0.4 mole) of lithium, 56.4 parts (0.44 mole) of naphthalene in 6000 parts of purified tetrahydrofuran under a purified argon atmosphere by the procedures given in Parts A and B of Example 1. The catalyst solution obtained is cooled to −30° C. and treated by addition of 130 parts (1.59 moles) of 2-ethyl-1,3-butadiene over a one-hour period. The temperature is maintained at −30° C. during this addition. Then the temperature is allowed to rise to about 25° C. The mixture is stirred at 25° C. for one-half hour and then cooled to about −40° C. Then 88 parts (2.0 moles) of ethylene oxide (previously purified by distillation through soda lime) is rapidly introduced with intense agitation. No gel is formed. The red color of the polymer solution disappears within a few minutes. The mixture obtained is allowed to stand overnight and is then treated by the procedure of Part D of Example 1 to yield the colorless viscous hydroxyl-terminated polydiene. End group analysis indicates an equivalent weight of 337 (theory 325).

EXAMPLE 6

*Preparation of Hydroxyl-Terminated Polyisoprene*

The lithium naphthalene catalyst is prepared from 2.78 parts (0.4 mole) of lithium, 54 parts (0.422 mole) of naphthalene in 20,000 parts of purified tetrahydrofuran under a purified argon atmosphere by the procedures given in Parts A and B of Example 1. The catalyst solution obtained is cooled to about −20° C. and treated by addition of 1720 parts (25.3 moles) of isoprene over a four-hour period. The temperature is maintained at about −20 to −30° C. during this addition. The mixture is then allowed to warm up until its temperature reaches about 25° C. The mixture is stirred at 25° C. for an hour and subsequently cooled to about −30° C. Then 176 parts (4.0 moles) of ethylene oxide (previously purified by distillation through soda lime) is introduced with turbulent agitation over a 15-second period. No gel is formed. The mixture obtained is agitated overnight and subsequently treated by the procedure of Part D of Example 1. The hydroxyl-terminated polyisoprene obtained has an equivalent weight of 4600 (theory 4345).

EXAMPLE 7

*Preparation of Polybutadiene by Lithium Metal Initiation*

The apparatus and precautions described in Example 1 are used. To 3100 parts of very pure tetrahydrofuran under an atmosphere of purified argon is added 4.2 parts (0.6 mole) of shiny Li wire. The solution is chilled to −30° C. and butadiene induction begun. Butadiene is distilled in slowly at −30 to −40° C. The Li metal surface becomes very shiny and faintly yellow within 5 minutes after butadiene introduction has been begun. The butadiene is introduced at −30° C. until a total of 643 parts (16.0 moles) has been delivered. About 10% of the lithium is recovered unreacted. The solution is agitated at −30° C. for an additional one hour and then is chilled to −40° C. 53 parts of pure ethylene oxide is run rapidly into the vigorously agitated solution over a period of 10 seconds. The solution becomes extremely viscous. The solution is allowed to warm to room temperature over a period of several hours. After standing overnight the solution is colorless. The glycol is purified as described in Part D of Example 1. The colorless glycol has an —OH equivalent weight of 1409. The theoretical OH equivalent weight, if 10% Li remained unused, is 1315. The isomer ratio is shown, by infrared analysis, to be 19% 1,4 cis, 4% 1,4 trans and 77% 1,2.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Hydroxyl-terminated polymeric hydrocarbons having a molecular weight within the range of from about 650 to 9900 having the structure $$HO-CH_2-CH_2-M-CH_2-CH_2-OH$$

wherein M is a bivalent polymeric hydrocarbon radical, 0–40% by weight of M consisting of bivalent units having the structure

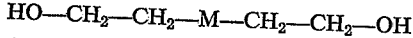

the remaining weight of M consisting of bivalent units taken from the group consisting of (A) isomeric 2-alkadiene units having the following structures (I)
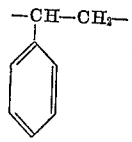

(II)
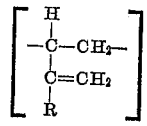

and (III)
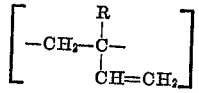

R in said 2-alkadiene units being a $C_1$–$C_8$ alkyl radical, (B) isomeric butadiene units having the following structures (IV)     $[-(CH_2-CH=CH-CH_2)-]$ and (V)
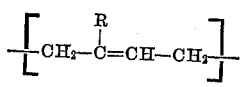

and (C) mixtures of said (A) and said (B) isomeric units, with the proviso that for any of said R containing 2-alkadiene units, about 60–80% of the respective (A) units by number are (I) units, about 20–40% by number, are (II) units, and, about 0–10% by number, are (III) units; with the further proviso that about 20–40% of the (B) units, by number are (IV) units and 60–80% of said (B) units, by number, are (V) units.

2. A hydroxyl-terminated polymeric hydrocarbon having a molecular weight within the range of 650 to 9900 and the structure $HO-CH_2-CH_2-M-CH_2-CH_2-OH$ wherein M consists of isomeric butadiene units having the respective structures (IV)     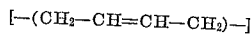

and

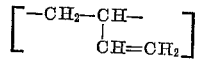

said (IV) units being present in an amount of about 20–40% by weight of M and said (V) units being present in an amount of about 60–80% by weight of M.

3. A hydroxyl-terminated polymeric hydrocarbon having a molecular weight within the range of 650 to 9900 and the structure $HO-CH_2-CH_2-M-CH_2-CH_2-OH$ wherein M consists of isomeric 2-alkadiene units having the following structures (I)
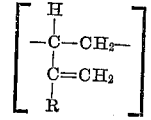

(II)
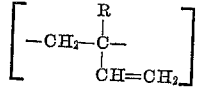

and (III)
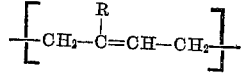

about 60–80% of the total number of said 2-alkadiene units in M being (I) units, about 20–40% being (II) units, and 0–10% being (III) units; R is a $C_1$ to $C_8$ alkyl radical.

References Cited in the file of this patent

UNITED STATES PATENTS

| | | |
|---|---|---|
| 2,586,594 | Arundale et al. | Feb. 19, 1952 |
| 2,631,175 | Crouch | Mar. 10, 1953 |
| 2,660,563 | Banes et al. | Nov. 24, 1953 |
| 2,692,829 | Hillyer et al. | Oct. 26, 1954 |
| 2,757,210 | Jenner | July 31, 1956 |
| 2,850,538 | Nobis et al. | Sept. 2, 1958 |
| 2,850,540 | Frank et al. | Sept. 2, 1958 |
| 2,877,212 | Seligman | Mar. 10, 1959 |

Notice of Adverse Decision in Interference

In Interference No. 94,757 involving Patent No. 3,055,952, E. J. Goldberg, HYDROXYL-TERMINATED POLYMERS, final judgment adverse to the patentee was rendered July 12, 1968, as to claims 1 and 3.

[*Official Gazette December 17, 1968.*]

Disclaimer 3,055,952.—*Earl J. Goldberg*, Wilmington, Del. HYDROXYL-TERMINATED POLYMERS. Patent dated Sept. 25, 1962. Disclaimer filed October 31, 1968, by the assignee, *E. I. du Pont de Nemours and Company*.
Hereby enters this disclaimer to claims 1 and 3 of said patent.
[*Official Gazette January 28, 1969.*]